United States Patent
Völkl et al.

(10) Patent No.: US 10,710,259 B2
(45) Date of Patent: Jul. 14, 2020

(54) CUTTING UNIT AND CUTTING PROCESS

(71) Applicant: TVI Entwicklung & Produktion GmbH, Irschenberg (DE)

(72) Inventors: Thomas Völkl, Bruckmühl (DE); Martin Mayr, Eiselfing (DE)

(73) Assignee: TVI ENTWICKLUNG & PRODUKTION GMBH, Irschenberg (DE)

( * ) Notice: Subject to any disclaimer, the term of this patent is extended or adjusted under 35 U.S.C. 154(b) by 29 days.

(21) Appl. No.: 15/994,923

(22) Filed: May 31, 2018

(65) Prior Publication Data

US 2018/0370055 A1 Dec. 27, 2018

(30) Foreign Application Priority Data

Jun. 2, 2017 (DE) .................. 10 2017 112 177

(51) Int. Cl.
| | |
|---|---|
| *B26D 1/157* | (2006.01) |
| *B26D 7/01* | (2006.01) |
| *B26D 1/143* | (2006.01) |
| *B26D 1/15* | (2006.01) |
| *A22C 17/00* | (2006.01) |
| *B26D 1/00* | (2006.01) |
| *B26D 3/16* | (2006.01) |
| *B26D 7/26* | (2006.01) |
| *B26D 7/32* | (2006.01) |

(52) U.S. Cl.
CPC ............. *B26D 1/157* (2013.01); *A22C 17/002* (2013.01); *B26D 1/0006* (2013.01); *B26D 1/143* (2013.01); *B26D 1/15* (2013.01); *B26D 3/161* (2013.01); *B26D 7/01* (2013.01); *B26D 7/2635* (2013.01); *B26D 7/32* (2013.01); *B26D 2001/0053* (2013.01); *B26D 2210/02* (2013.01)

(58) Field of Classification Search
CPC .......... B26D 1/157; B26D 1/143; B26D 1/15; B26D 1/0006; B26D 3/161; B26D 7/01; B26D 7/2635; B26D 7/32; B26D 2001/0053; B26D 2210/02; A22C 17/002
See application file for complete search history.

(56) References Cited

U.S. PATENT DOCUMENTS

| | | | | |
|---|---|---|---|---|
| 1,645,551 | A * | 10/1927 | Stukart ................. | B26D 1/157 83/90 |
| 9,327,420 | B2 * | 5/2016 | Koch ................... | B26D 7/0616 |
| 9,475,204 | B2 * | 10/2016 | Koch ................... | B26D 7/0616 |
| 9,895,820 | B2 * | 2/2018 | Weiss .................... | B26D 5/00 |
| 10,245,745 | B2 * | 4/2019 | Volkl ................... | B26D 7/0608 |
| 10,492,504 | B2 * | 12/2019 | Volkl ................... | A22C 25/08 |

(Continued)

FOREIGN PATENT DOCUMENTS

| | | |
|---|---|---|
| CH | 571939 A5 | 1/1976 |
| DE | 2153065 A1 | 5/1972 |

(Continued)

*Primary Examiner* — Omar Flores Sanchez

(74) *Attorney, Agent, or Firm* — Brooks Kushman P.C.

(57) ABSTRACT

A cutting unit to facilitate ejecting a slice that is cut off from a product strand a radial distance between a blade edge of the rotating blade. The functional edge of the stop plate may be adjusted during the cutting movement. In one embodiment, the functional edge of the stop plate may be adjusted at an end of the cutting movement.

6 Claims, 15 Drawing Sheets

(56) References Cited

U.S. PATENT DOCUMENTS

| | | | | |
|---|---|---|---|---|
| 2005/0000344 A1* | 1/2005 | Bucks | ............... | B26D 1/0006 |
| | | | | 83/591 |
| 2011/0185865 A1* | 8/2011 | Weber | ............... | B26D 7/2635 |
| | | | | 83/13 |
| 2011/0247470 A1* | 10/2011 | Weber | ............... | B26D 7/2635 |
| | | | | 83/401 |
| 2013/0319196 A1* | 12/2013 | Schmeiser | ............... | B26D 5/02 |
| | | | | 83/34 |
| 2014/0366696 A1* | 12/2014 | Weiss | ............... | B26D 5/00 |
| | | | | 83/162 |
| 2015/0190939 A1* | 7/2015 | Gerlach | ............... | B26D 7/06 |
| | | | | 83/13 |
| 2017/0165858 A1* | 6/2017 | Bochtler | ............... | B26D 1/0006 |
| 2017/0312931 A1* | 11/2017 | Volkl | ............... | B26D 5/06 |

FOREIGN PATENT DOCUMENTS

| | | | |
|---|---|---|---|
| DE | 2224375 | A1 | 12/1972 |
| DE | 102010035657 | A1 | 9/2011 |

* cited by examiner

CUTTING UNIT AND CUTTING PROCESS

CROSS-REFERENCE TO RELATED APPLICATIONS

This nonprovisional application claims the benefit of German Patent Application No. 102017112177.3 filed Jun. 2, 2017, the entire disclosure of which is incorporated herein by reference.

FIELD OF THE INVENTION

The invention relates to a cutting unit for cutting slices from a typically strand-shaped based product, thus a food strand like, e.g., a sausage strand or cheese strand, typically with a cross-section that is constant over a length of the strand or a fresh meat strand than typically with a cross-section that is variable over its length.

Typically cut off slices shall be as close as possible to a particular target weight.

BACKGROUND OF THE INVENTION

Thus a blade is moved through a cross-section of the strand transversal to a longitudinal direction of the strand and thus a slice is cut off and the blade is moved back again in the transversal direction. Before cutting off the next slice, the strand is advanced in the longitudinal direction, the feed direction relative to the blade along a contact surface or along a support up to a stop, in particular a contact plate on a side of the blade that is opposite with respect to a main portion of the strand.

When a strand has an irregular cross-section, the support can also be a circumferentially closed form tube.

Subsequently a stop plate is being recited without limiting the invention to this embodiment of a stop. Thus a stop plate does not have to be a plate that is continuously closed along its main plane, in particular not with a uniform thickness in all portions, but the plate can have cutouts from one main surface to another as long as this maintains its function as a stop.

A stop plate of this type can also include recesses in one of the main surfaces, in particular the contact surface for the strand in order to minimize in particular the sliding friction relative to the meat strand. By the same token, the plate can also be provided as a perforated plate or as a grid.

Thus the stop plate typically moves back and forth in the transversal direction in an oscillating manner together with the blade. At an end of the cut-off process, the cut off slice flips over the portion of the circumferential edge of the stop plate, the functional edge, away from the blade onto a contact surface.

Viewed in the longitudinal direction, namely against the feed direction, the stop plate and the blade typically do not overlap, for rotating blades in particular the throwing circle of the blade but there is a radial distance between both components so that there is only minimum distance for the slice when the cut-off slice is moved through between the stop plate and the blade.

For this purpose, the radial distance would have to be as large as possible; however, in order to press strand material through, the radial distance should be as small as possible. Therefore, an acceptable median value of typically 2 mm to 10 mm is selected in practical applications. The thickness of the cut-off slice is determined by the axial distance between the cutting edge of the blade and the stop surface of the stop plate and is typically adjustable in order to be able to vary slice thickness.

Thus it is also known that the blade lifts off from the front surface of the strand in the longitudinal direction after cutting off the slice and moving the blade back in the transversal direction in order to be able to commence on the one hand side earlier with moving the strand forward and on the other hand side in order to prevent a smearing of the back side of the blade as well as of the front surface of the strand.

Different blade shapes can be used in order to respectively achieve a pulling cut.

Strip-shaped blades or bar-shaped blades, in particular straight blades which are moved for the cutting in a direction of its longitudinal extension, typically have a small width in the penetration direction into the strand for weight reasons, wherein the width is less than the cross-section of the strand and the blades have to be moved at least with their dull rear edges away from the face of the remaining strand in order to move back after the cut off process is completed and in order for the blades not to scrape along the face of the strand with their rear edge.

Even for a sufficient width, thus greater than the cross-section of the strand, this is advantageous in order to prevent a smearing of the backside of the blade as well as of the front face of the strand.

Circular disk-shaped blades which rotate about an axis, in particular about its central axis, have to be offset with their axis initially approximately about the radius of the blade from an edge of the cross-section of the strand in the transversal direction thus radially so that moving the strand forward can be commence.

For the same reasons as for a bar-shaped or strip-shaped blade, additional lifting of the blade is recommended after an end of the cutting process in the longitudinal direction.

Rotating sickle-shaped blades where a radial distance of the cutting edge from the rotation axis increases along the cutting edge and which taper into a point towards their free end very quickly move out of the overlap with the cross-section of the strand after completing the cutoff process. However, using them together with a stop plate which is used as a stop for the strand is disadvantageous.

Namely, in the longitudinal direction, an axial distance shall be provided between the outer circumference of the blade and the concave functional edge of the stop plate wherein the axial distance shall be the same everywhere along the extension of the functional edge.

For a sickle-shaped blade this could only be accomplished by pivoting the stop plate at least during the cutting process together with the sickle blade viewed in longitudinal direction but by not rotating it together with the sickle blade in order to provide a stop between an end of a first cut off process and a beginning of a second cut off process for the advanced strand.

Thus this requires a complex mechanical configuration.

BRIEF SUMMARY OF THE INVENTION

Technical Object

Thus it is an object of the invention to provide a cutting device with a blade and a stop plate which improves shape precision and weight precision of the cut off slices and to provide a method for operating device.

Solution

With respect to a method for cutting off slices, the object is achieved in that the radial distance between the functional edge of the stop plate and the cutting edge of the blade is adjusted while cutting off the slice.

The stop plate provides during applying and contact pressing the strand at the back side of the stop plate before beginning the cut off process that it is prevented over an entire face of the strand that the cross-sectional shape of the strand is increased by expansion through the axial contact pressure and on the other hand side that the plastically deformable material of the strand does not get squeezed out through the cutting gap between the blade and the contact plate during the cutoff process in an undesirable manner.

By the same token, the cut-off slice has to be able to slide easily through the cutting gap and have to be able to flip and drop without problems over the functional edge of the stop plate that is typically arranged at a slant angle at an end of the cutoff process.

Therefore, the radial distance between the cutting edge and the stop plate is increased according to the invention, in particular towards an end of the cutoff process so that the slice drops onto a drop surface, typically a conveyor belt, without distortions or bulges.

This can be accomplished, e.g., in that a velocity of the blade in the penetration direction is smaller than the velocity of the stop plate during cut off.

An increase of the radial distance can be continuously augmented during the cutoff process or during a defined time frame, in particular at an end of the cut off process.

In order to provide a stop over the entire face of the strand, the radial distance, the starting distance before a beginning of the cutoff process, shall be as small as possible, in particular, be 0, or the stop plate can even overlap slightly in a radial direction with the blade at a beginning of the cutoff process or directly before in order to not only cover the face of the strand completely, but in order to also protrude beyond the strand.

If the overlap is still provided at a beginning of the cutoff process, it may only be small enough so that the slice thickness that is already provided in the overlap portion does not influence the slice thickness advantageous. Advantageously the relative position of the stop plate and the blade is controlled so that no radial overlap is provided anymore, but the radial distance is 0 or has a positive value at a beginning of the cut off process, thus penetrating into the strand.

Before a beginning of the penetration of the blade into the cutting strand for the next cut off process, in particular before a beginning of the radial approach movement of the blade to the meat strand, the blade and the stop plate should have reached the starting distance from each other again, thus all changes of the relative position that were performed during the preceding cut off process, should have been reversed again.

Advantageously this is performed directly after cutting the slice off, in particular if the blade performs a lift off movement from the meat strand in the axial direction, in particular in the feed direction of the strand during or at least after completing the lift off movement.

The return movement of the stop plate relative to the blade towards the starting distance from each other should be completed at the latest when the strand that is pushed forward reaches the stop plate and in particular the feed movement of the strand is controlled accordingly.

If the rotating blade—viewed in the axial direction—has a non-circular contour which, however, only extends along or within the throwing circle, the return movement of the stop plate into the starting position can already begin as soon as the cross section of the blade does not overlap with the cross section of the strand in the axial direction anymore, irrespective whether the throwing circle of the blade still overlaps with the cross section of the strand, thus in particular before the blade is moved in the transversal direction far enough so that the distance between the rotation axis of the blade and the strand cross section is greater than the radius of the blade.

With respect to the cutting unit the object is achieved for a generic cutting unit according to the preamble of claim 1 in that the stop plate is movable relative to the blade in a direction which includes at least a component in direction of the main plane of the blade, in particular in a direction which extends parallel to the main plane of the blade.

Advantageously this direction is a radial direction with respect to the rotation axis of a rotating blade.

Furthermore, an electronic control is provided which is configured to control this radial distance, in particular also during the cut off of a slice, thus during operations of the cutting unit.

The stop plate is positioned relative to the blade so that the stop plate is with its major portion radially outside of the throwing circle of the blade, in particular the throwing circle of the cutting edge, in particular of the blade itself, viewed in the axial direction of a rotating blade, and/or in the feed direction of the meat strand and of the strand slide that moves the meat strand which however does not necessarily have to be provided.

Thus, the stop plate can overlap slightly with its functional edge in the radial direction with the throwing circle of the blade or can even overlap the blade itself, in particular at the most by an amount which is at most 50%, better at the most 30%, better at the most 20% of the radial extension of cutting edge that thickens in a radially inward direction before a beginning of the cutoff process.

Thus optimum support of the strand is provided.

For blades rotating blades as well as oscillating blades, for example, bar-shaped oscillating blades are being used in a cutting unit according to the invention.

In a rotating blade the circumferential edge will be configured as a cutting edge at least over a cutting edge portion viewed in the axial direction, the direct the rotation axis of the blade, no matter if this cutting edge portion is formed as a circular segment or as a spiral that is arranged in a plane thus configured sickle-shaped.

The circumferential portion of the stop plate that is oriented towards the rotation axis of the blade, the so-called functional edge, is then typically configured concave with a curvature radius which is advantageously identical to or slightly larger than the curvature radius of the throwing circle of the blade.

The curvature radius of the concave functional edge in case it is not identical to the curvature radius of the throwing circle of the blade—has a curvature radius that is at the most 20%, better at the most 10% greater, better at the most 5% greater in order to provide a sufficient support function for the strand to be cut off during the cutoff process.

Thus, in particular the stop plate is adjustable in the feed direction of the strand in particular in the axial direction of a rotating blade with respect to the axial thickness distance from the blade plane which determines the thickness of the slice to be cut off.

The stop plate is advantageously stationary in the rotation direction of the blade, thus moves synchronously or non-synchronously with the blade but in the same penetration direction in a transversal direction to the rotation axis of the rotating blade and/or the feed direction of the strand together with the blade.

Advantageously the cutting edge at the typically plate-shaped blade is only ground on one side wherein in particular the ground side is oriented towards the stop plate.

The cutting unit can furthermore include a strand support for feeding the strand in the feed direction of the strand and a strand drive for moving the strand along the strand direction in the feed direction towards the blade. The strand support is advantageously at the base frame.

The strand support terminates with its end that is in front in the feed direction at a side of the blade that is oriented opposite to the stop plate and extends from there to the rear end of the strand support.

The strand support can be made exclusively from a contact surface for the strand to be cut up or can envelope the strand circumferentially partially or completely in the form of a support tube.

The strand drive can include a strand slide that is movable in a linear manner in the extension direction of the strand support wherein the strand slide is then arranged behind a rear end of the meat strand and either only moves the meat strand forward or also includes grippers for gripping and retaining the strand wherein the grippers can be used to advance the strand and wherein the strand can be otherwise prevented from lifting off from the strand slide.

For a sufficient inclination of the contact surface the strand, however, can also slide forward only driven by its own weight or in that the contact surface is configured as a conveyer in a direction towards the stop plate and the cutting unit.

For a rotating blade the rotation axis of the blade is positioned and movable in the transversal direction to the rotation axis so that the in particular plate-shaped blade Can either cover the cross-section of the fed strand, thus in particular the cross section of the feed tube completely in a cutting position viewed in the axial direction of the blade, and Can be arranged in a feed position completely outside of the cross-section.

The stop plate, however, is arranged in the longitudinal direction or the axial direction of the device and movable in the transversal direction thereto, in particular in the penetration direction of the blade, so that the stop plate overlaps in the feed position with the cross section of the fed strand, in particular the support tube, at least partially, advantageously completely, and on the other hand side, overlaps in the cutting position with this cross section at least partially, at the latest immediately after, cutting off the slice, not at all anymore.

Depending on the blade shape, in particular for bar-sharped or rod-shaped blades, it is well known that the blade is lifted off from the face of the strand in the longitudinal direction after completion of the separation of a slice in order to be able to begin with the forward sliding of the strand in a direction of the stop plate already at the beginning of the lift off movement.

This is usable for the instant invention like a shape of a rotating blade where the blade does not protrude beyond the throwing circle of the cutting edge portion of the blade anymore so that there is the option to move the meat strand forward in circumferential portion where the circumferential edge of the blade has a smaller distance from the rotation axis than in the cutting edge portion directly after the rear edge of the cutting edge portion in the rotation direction of the blade viewed in the feed direction has exited the cross section of the strand, in particular of the support tube.

In case of a non-circular blade of this type, a lift off movement of the blade can be typically omitted. Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show.

DETAILED DESCRIPTION

Figure 1:
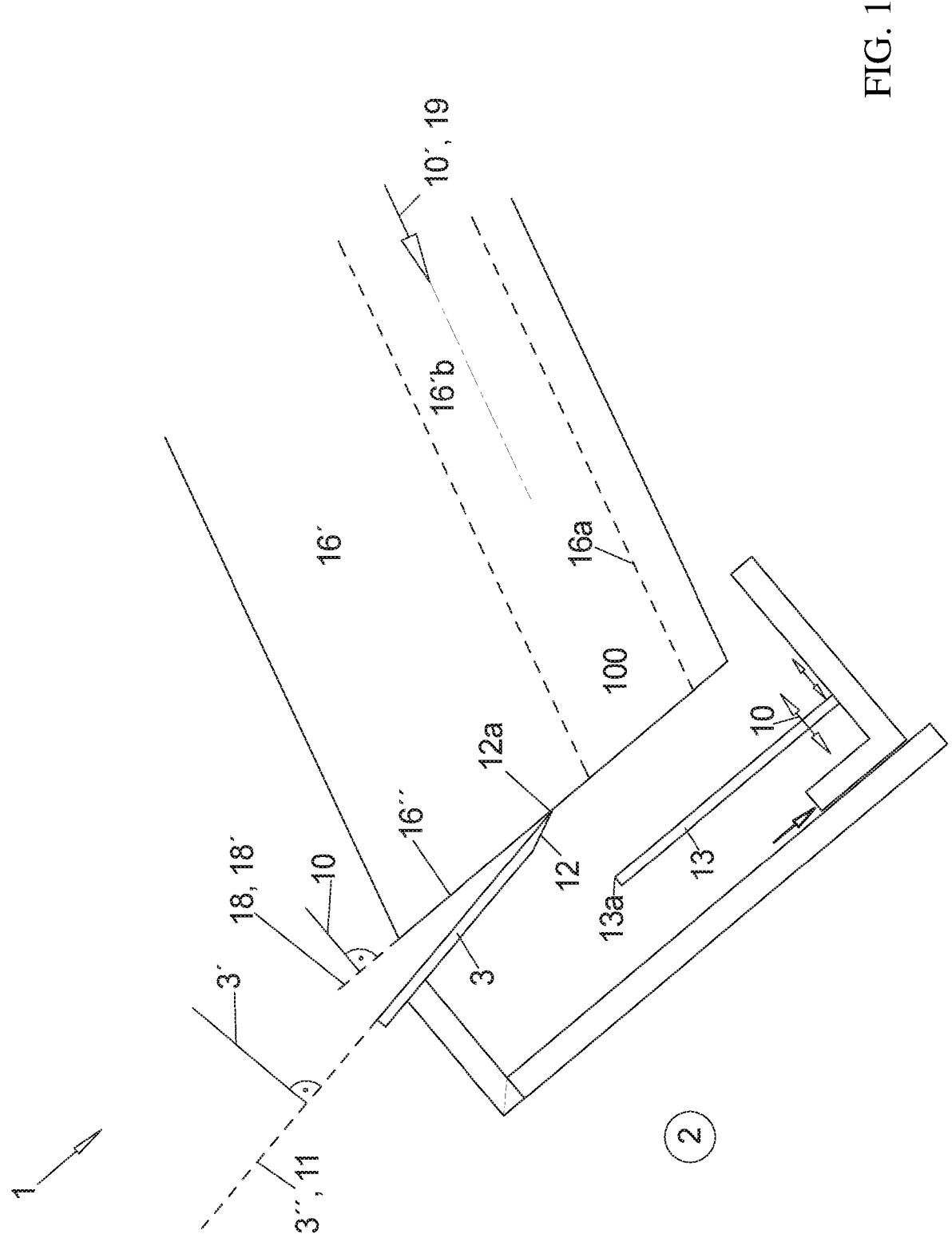
FIG. 1 illustrates a longitudinal sectional view through a product strand for a first embodiment of the cutting unit in a functional position describing the different defined directions.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention.

FIG. 1 illustrates a side view an analogy to the view of FIGS. 1A through 2D of a longitudinal cut through a form tube and a first embodiment of a cutting unit 1, only in order to clarify the different layers of directions and planes that are being used.

The product strand 100 is moved onto a contact surface 16a advantageously in a form tube 16' with a circumferentially closed cross-section in the feed direction 10', which is typically the main extension direction of the product strand 100, wherein the feed direction 10' is the direction towards the forward open end of the form tube 16' where the blade 3 is arrange for cutting off the slices 101.

The blade 3 illustrated herein is a strip-shaped blade 3, which has a straight cutting edge 12a and which is driven to oscillate in the direction of this edge 12a in order to achieve the desired cutting effect.

The straight cutting edge 12 of the blade 3 that is ground advantageously only one side, namely on the side that is oriented away from the form tube 16', penetrates in a penetration direction 18 into the cross section 100" of the form tube 16' and thus off the product strand 100 in order to cut off the slice 101 and thus moves in a penetration plane 18 and thus runs through an entirety of the product strand 100 which cuts off the slice 101. Thereafter the blade moves in the retraction direction 18' which is oriented against the penetration direction 18 and moves back again into the starting position.

Thus, the blade 3 at least its cutting edge 12a moves as close as possible along the forward face 16" of the form tube 16', possibly without touching it, and therefore the front face 16" of the form tube 16' extends parallel to the penetration direction 18 and on the other hand side parallel to the orientation of the cutting edge 12a of the blade edge 12 that is oriented in the viewing direction of FIG. 1.

This penetration direction 18 does not extend at a right angle to the feed direction 10', e.g., because oval slices shall be cut off from a circular cross-section 100".

Thus the penetration direction 18 is not in or parallel to the main plane 3" of the blade 3 which is possible, for example, when the blade 3 is a strip-shaped blade as illustrated, which is driven to oscillate in a direction of its cutting edge 12a in order to obtain the desired cutting effect. The blade orthogonal 3' is the orthogonal of the main plane 3" of the blade 3. For a rotating blade this is typically also the rotation axis of the blade 3.

The main plane 3" is the plane in which the typically plate-shaped blade 3 has its two largest extensions.

For this first embodiment of the cutting unit the blade 3 is movably attached at a cutting frame and drivable to oscillate.

The cutting unit 1 furthermore includes a stop plate 13 as a stop for the product strand 100 that is pushed out beyond the forward free end of the form tube 16' wherein a contact surface 13.1 of the stop plate 13 that is oriented towards the form tube 16' extends parallel to the penetration direction 18 and thus also to the front surface 16" of the form tube 16' in case such form tube is provided.

The stop plate 13 is on a side that is opposite to the form tube 16' with respect to the blade plane 3".

The stop plate 13 is movable in the longitudinal direction 10 which forms an orthogonal to the typically flat contact surface 13.1 as well as the orthogonal of the penetration plane which is defined by the penetration direction 18 and the orientation of the cutting edge 12a which determines the slice thickness d.

Additionally the stop plate 13 or another stop 13 is adjustable in the penetration direction 18 in order to adjust the gap 22 between the functional edge 13a of the stop plate 13 that is oriented towards the blade 3 and the cutting edge 12a of the blade edge 12 of the blade 3 also during the cutting movement.

FIGS. 1A through 2D illustrate a second and a third embodiment in the same viewing direction as FIG. 1, wherein the second and third embodiment is configured simpler than the first embodiment of the cutting unit 1 in different functional positions of the blade 3 and of the contact plate 13, on the one hand side relative to each other and on the other hand side relative to the product strand 100, thus to the front surface 16" of the form tube 16' or at least to the contact surface 16 for the product strand 100.

Thus the blade 3 is a rotating advantageously circular disk-shaped blade 3, which is illustrated movably supported in the feed direction 10' in different functional positions when cutting a slice 101 from a product strand 100 which is completely enclosed in a form cavity 16' of a form tube 16'.

Thus, the rotation axis 3' of the blade 3, whose blade plane 3" extends parallel to the penetration direction 18, is the axial direction 10 which simultaneously forms the blade orthogonal 3' of the blade 3 and which extends in this case parallel to the feed direction 10' of the product strand 100, which is simultaneously the orientation of the contact surface 16a and of the entire form tube 16'.

It is evident that the product strand 100 arranged in the tubular form cavity of the form tube 16' that is tubular and open at least in front is driven with its lower contact surface 16a by a strand slide 17 that is driven by a strand drive 19 at its back end forward in the feed direction 10' up to the stop at the back side which is formed by the stop surface 13.1 of the stop plate 13 which is arranged in the axial direction 10 at a distance in front of the form tube 16' and in front of the blade plane 3".

The stop surface 13.1 of the stop plate 13 extends in front of the forward face 16" of the form tube 16' and thus has an axial distance 22b from the blade 3 which defines the thickness d of the slice 101 to be cut off Grippers 21 can be provided at the front end of the strand slide 17 wherein the grippers 21 retain the rear end of the product strand 100 and prevent it from lifting off from the front surface of the strand slide 17.

Thus, the stop plate 13 is also adjustable during the cutoff process in a direction 18/18' relative to the blade 3.

In the third embodiment of FIGS. 2A-2D the stop plate 13 is adjustable in the axial direction 10 relative to the blade 3 not only before a beginning of cutting up the product strand in order to determine the thickness d of the slices 101 to be produced but also during each individual cutting process.

When the blade 3 and the stop plate 13 are attached at the cutting frame of the cutting unit 1 as illustrated the stop plate 13 shall be movably attached in a controlled manner in the direction 18/18' at the cutting frame, also during the individual cutting processes not only before the cutting process begins. In the axial direction 10 the stop plate 13 is always adjustable relative to the cutting frame in order to predetermine a thickness d of a slice 101.

In FIGS. 1A through 2B the rotating blade 3 is attached in the cutting frame so that it is rotatable about its blade axis 3' so that all blade movements besides the blade rotation are jointly performed by the cutting frame and the blade 3 as evident in particular from FIGS. 2A through 2D. The cutting frame is movably attached at the base frame 2 of the machine.

Alternatively the cutting frame can also be omitted and the blade 3 on the one hand side and the stop plate 13 on the other hand side can be attached directly at the base frame 2 independently from each other.

In the third embodiment of FIGS. 2A through 2D a movement of the stop plate 13 in the axial direction 10 is also possible in a controlled manner during the cutting process. For this purpose a corresponding drive and a corresponding control are provided.

In order to cut off the slice 101 the rotating blade 3 moves in FIGS. 1A through 2D with its rotation axis 3' in the penetration direction 18 thus in a direction of the product strand 100 that protrudes from the form tube 16' (FIGS. 1A/2A) and penetrates into this cross section 100" of the meat strand (FIGS. 1B/2B) and thus separates the product strand 100 that protrudes beyond the form tube 16' increasingly as a slice 101, which slides through the gap 22 between the blade 3 and the functional edge 13a of the stop plate 13.

When the cutting edge 12 of the blade 3 has cut through the product strand 100 completely, the cut off slice 101 flips over the functional edge 13a of the stop plate 13 which is oriented towards the blade downward due to the forward and downward oriented slope of the form tube 16' (FIGS. 1C/2C) and drops onto a non-illustrated placement surface or an extraction conveyer.

Simultaneously or directly thereafter the cutting frame with the blade 3 is moved back against the penetration direction 18 in the retraction direction 18' (FIGS. 1D/2D) into the starting position and the product strand 100 is moved by the strand slide 17 beyond the front surface 16" in a direction towards the stop plate 13 which now covers the cross section 100" at least partially again until the product strand contacts the contact surface 13a of the stop plate 13.

Figure 1A:
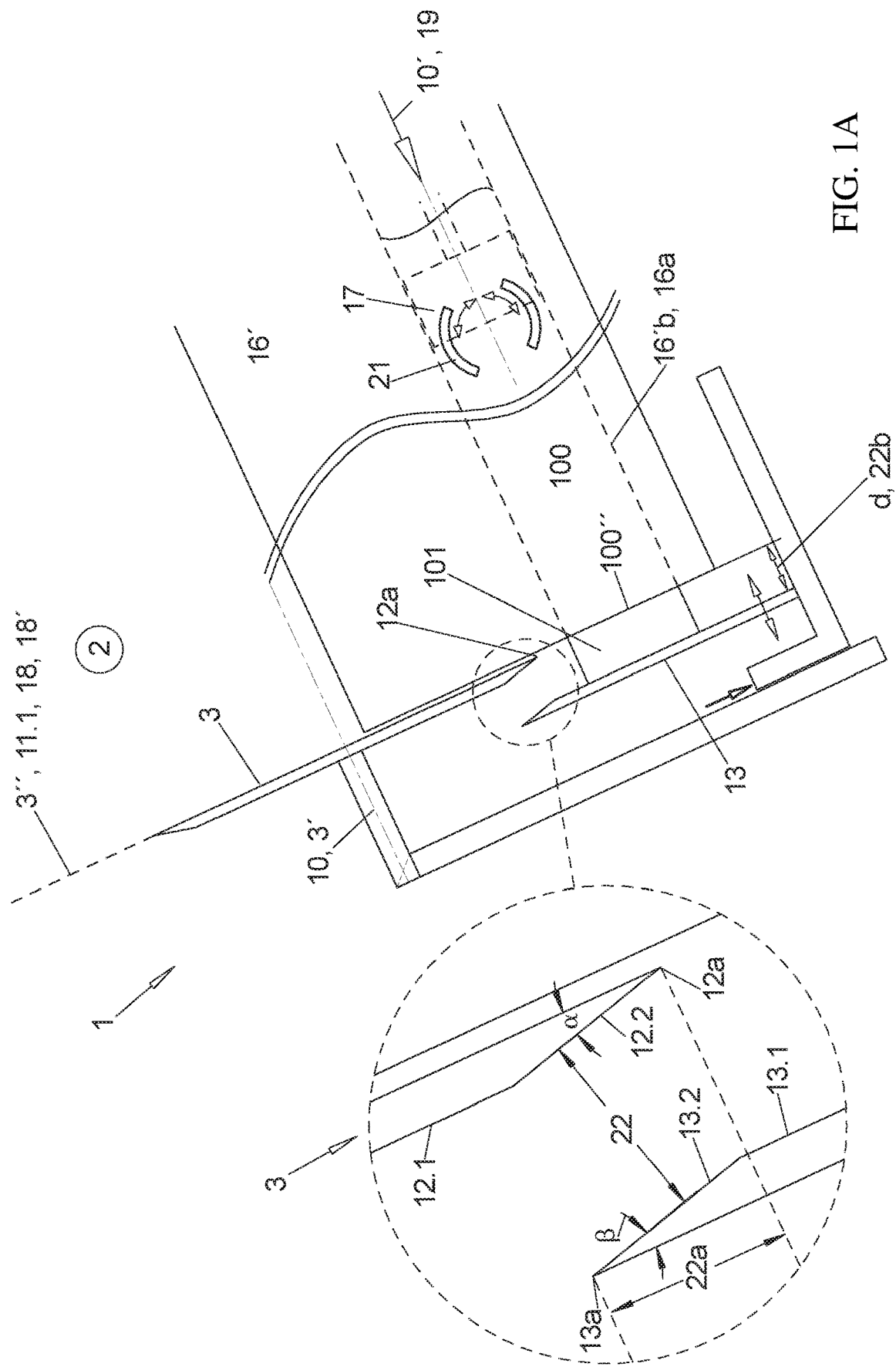
FIG. 1A illustrates a longitudinal sectional view through a product strand for a second embodiment of the cutting unit in different functional positions while cutting off a slice.
Figure 1B:
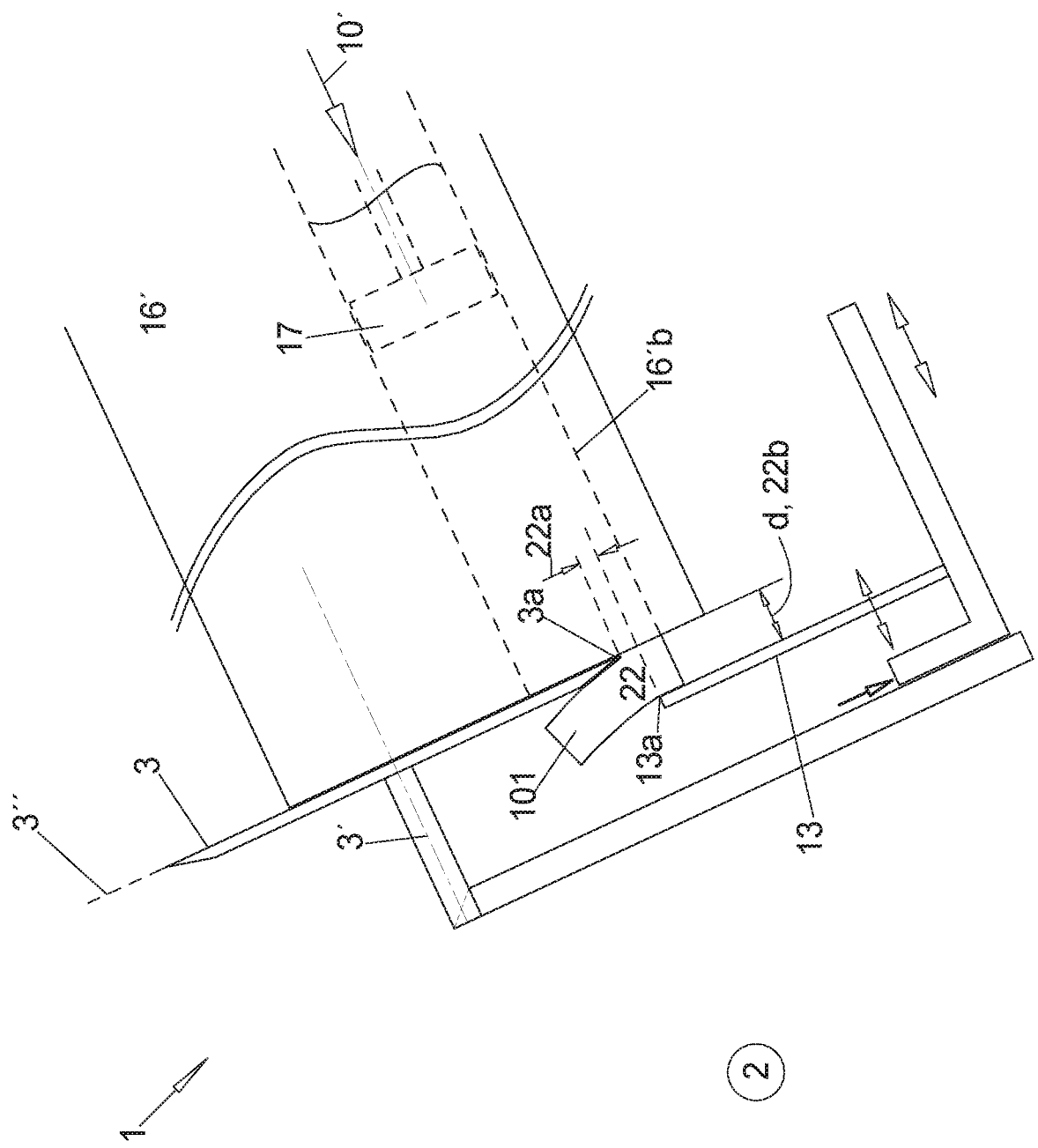
FIG. 1B illustrates a longitudinal sectional view through a product strand for a second embodiment of the cutting unit in different functional positions while cutting off a slice.

It is evident that also the radial distance 2a between the functional edge 12a and the cutting edge 12a changes wherein a differentiation needs to be made whether the flat contact surface 13.1 terminates with the functional edge 12a (FIGS. 1B through 2D) or whether an increasingly slanted plane 13.2 adjoins at the flat contact surface 13.1 in the outward direction wherein a free end of the increasingly slanted plane 13.2 forms a functional edge 13a (blown-up detail in FIG. 1A).

Figure 1C:
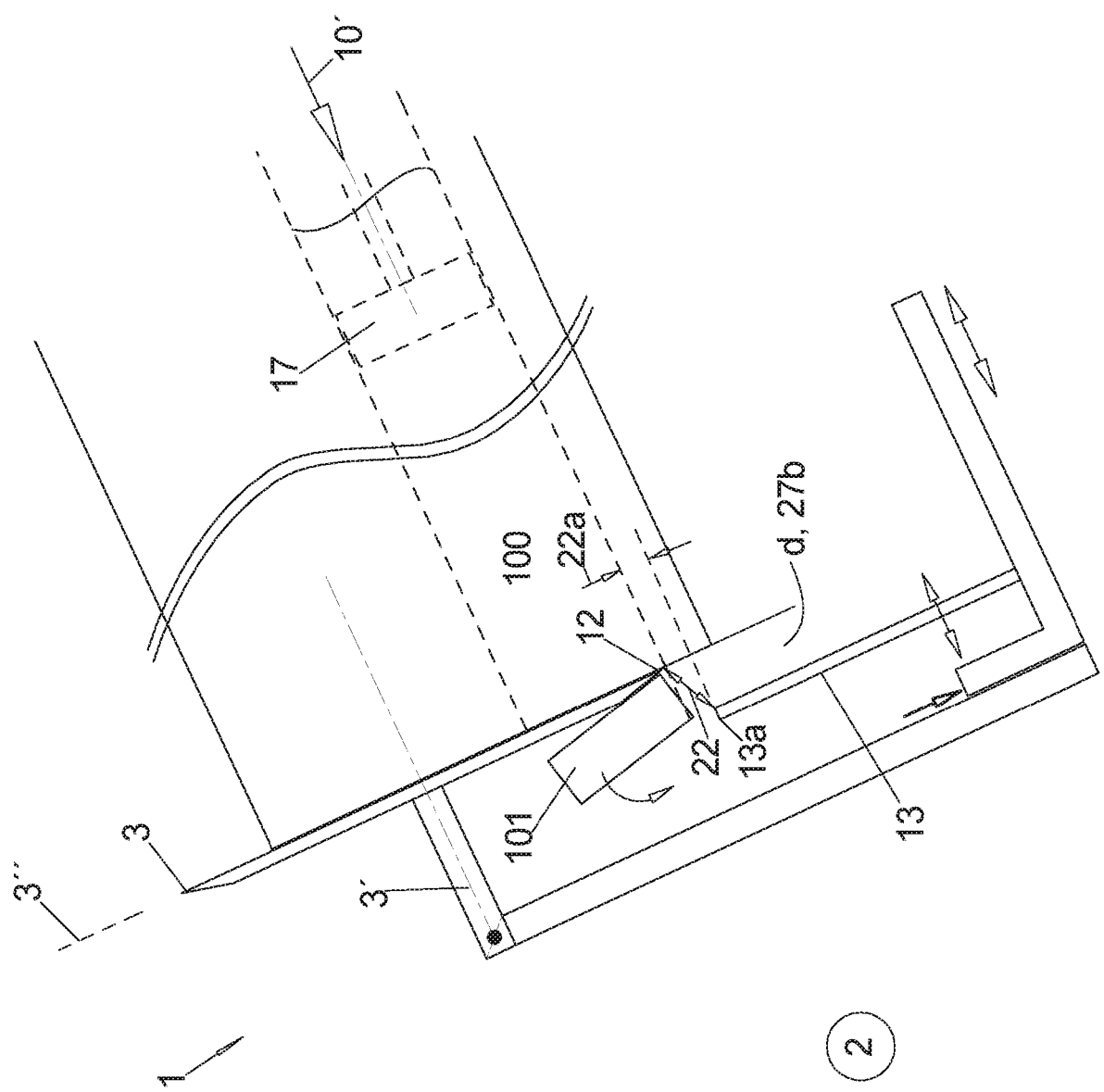
FIG. 1C illustrates a longitudinal sectional view through a product strand for a second embodiment of the cutting unit in different functional positions while cutting off a slice.
Figure 1D:
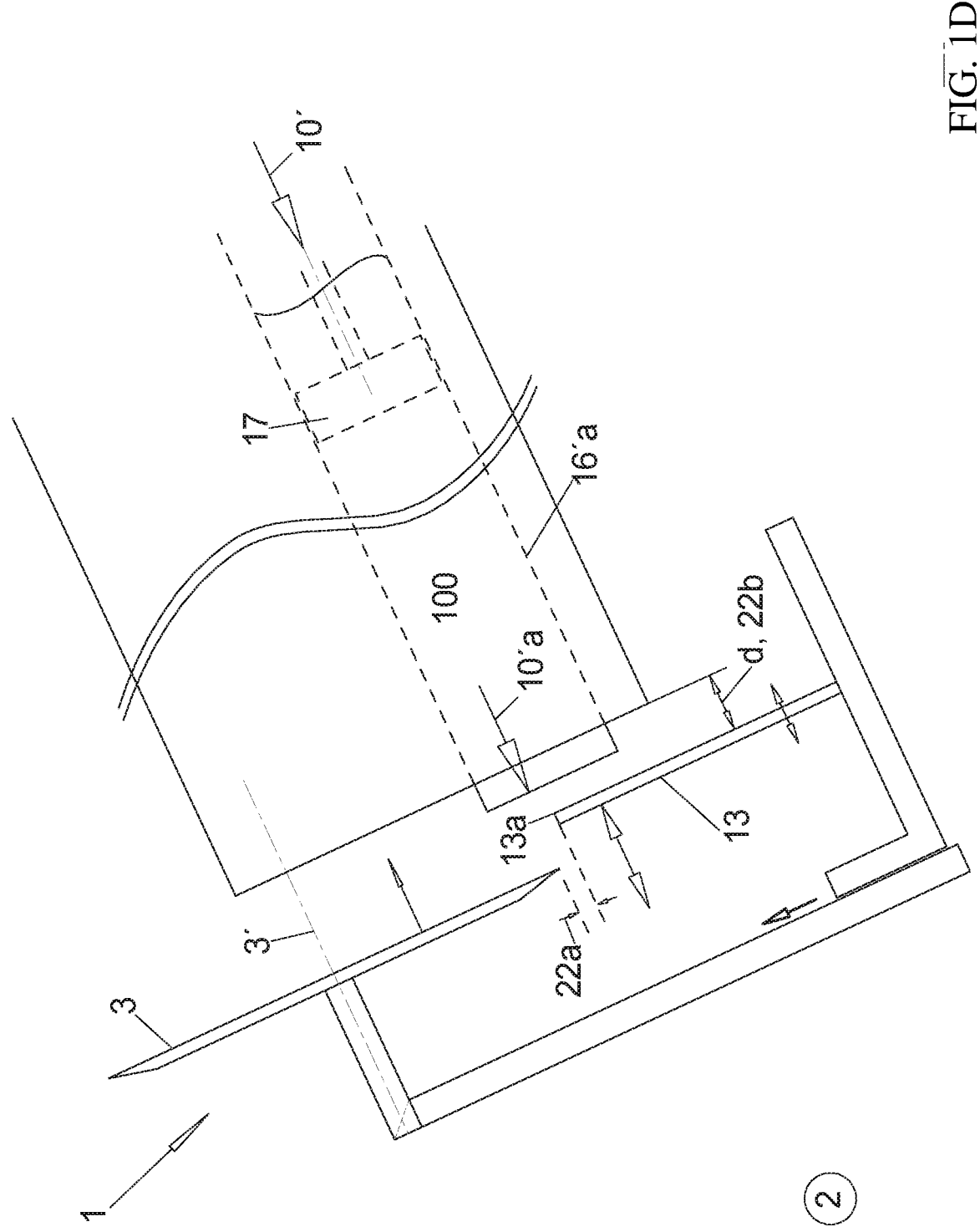
FIG. 1D illustrates a longitudinal sectional view through a product strand for a second embodiment of the cutting unit in different functional positions while cutting off a slice.
Figure 2A:
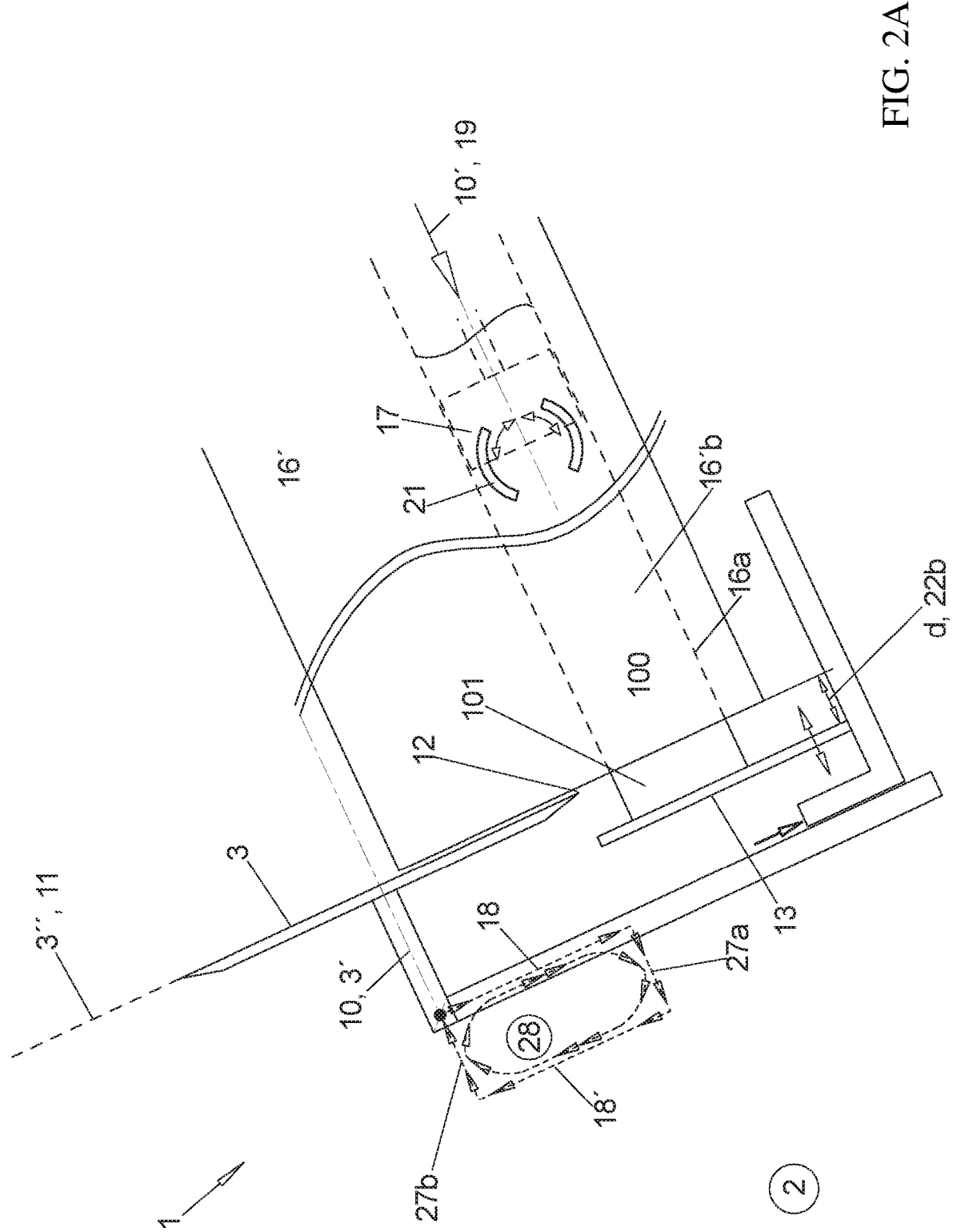
FIG. 2A illustrates a longitudinal sectional view through a product strand for a third embodiment of the cutting unit in different functional positions while cutting off a slice.
Figure 2B:
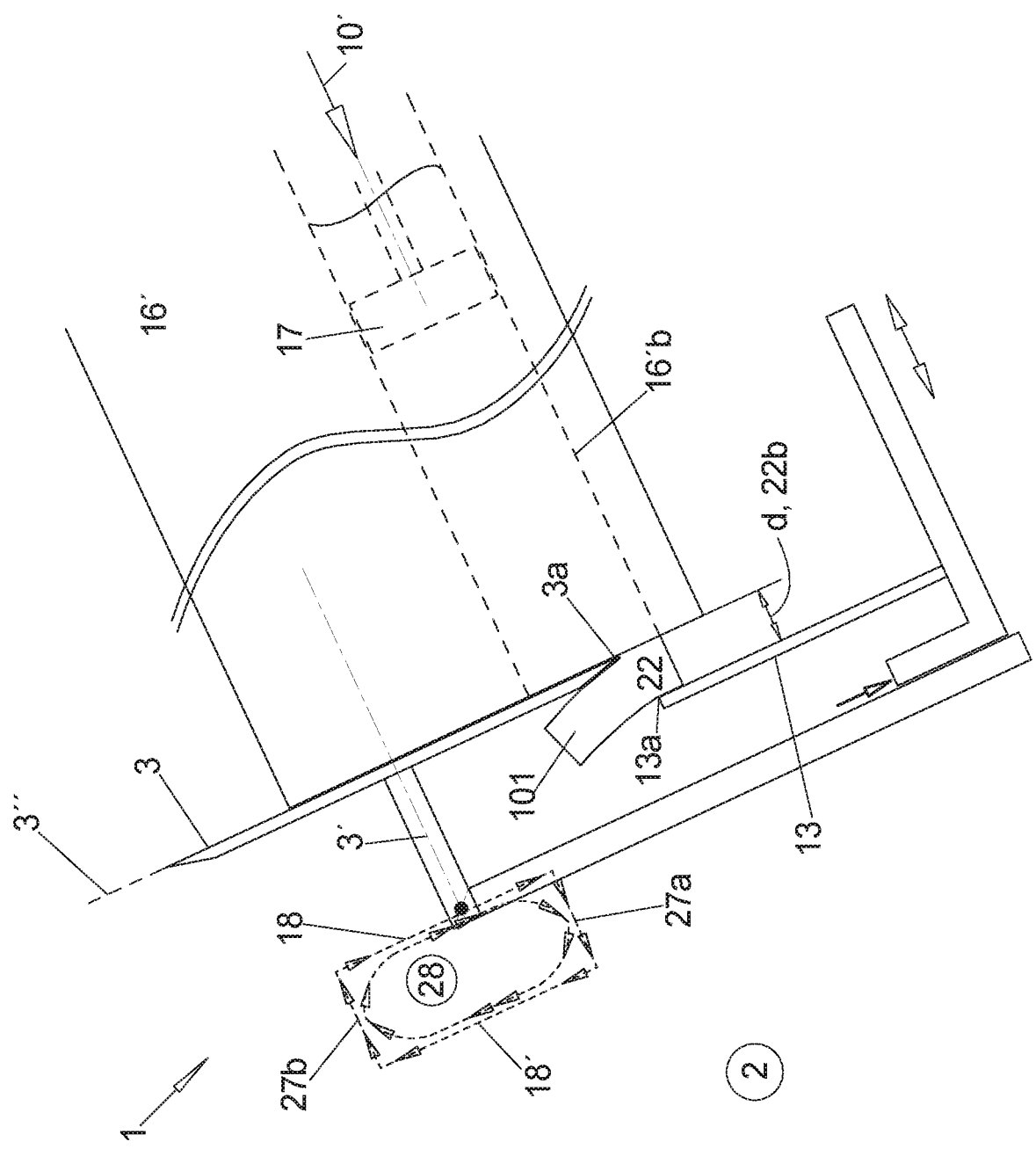
FIG. 2B illustrates a longitudinal sectional view through a product strand for a third embodiment of the cutting unit in different functional positions while cutting off a slice.
Figure 2C:
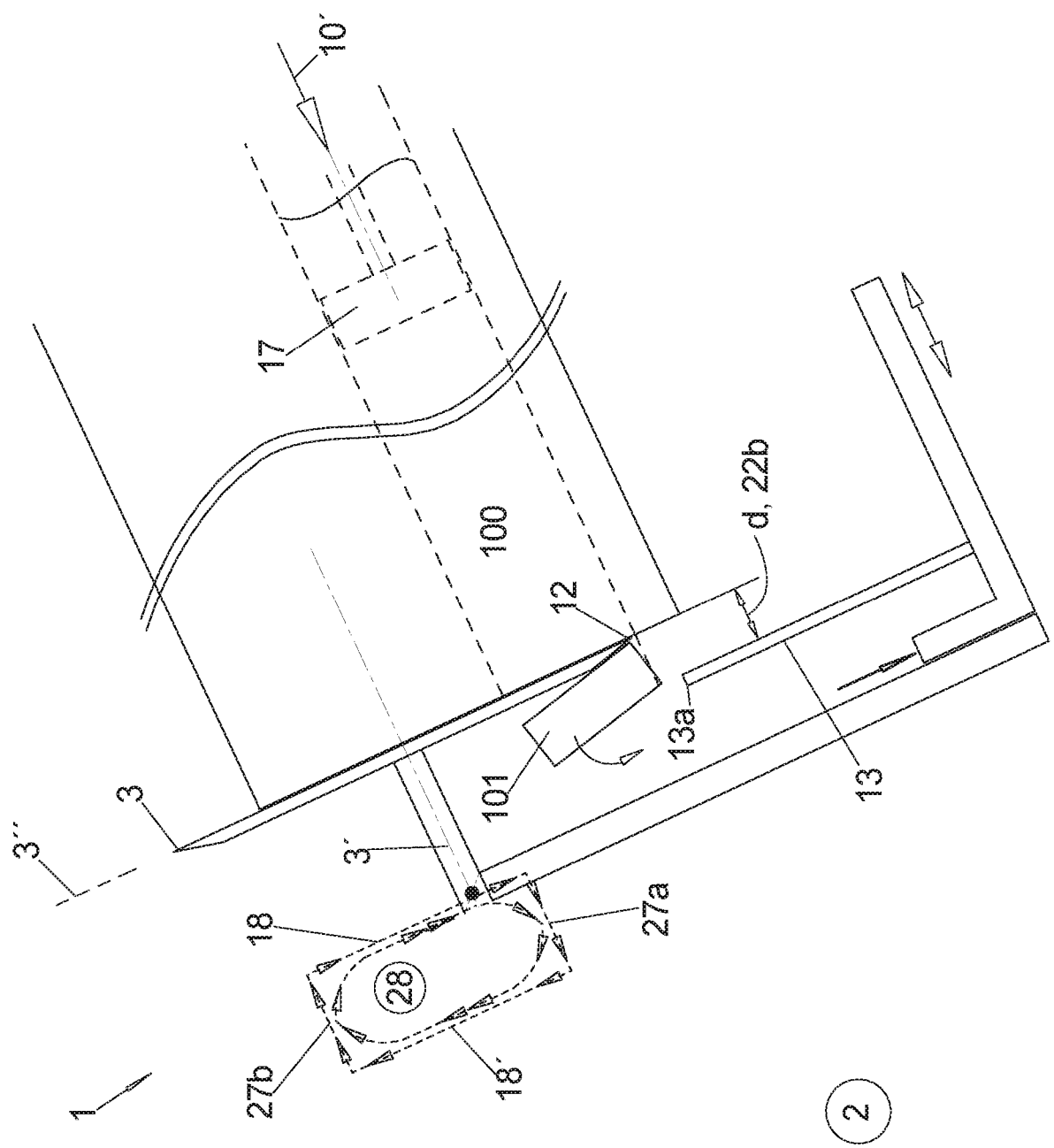
FIG. 2C illustrates a longitudinal sectional view through a product strand for a third embodiment of the cutting unit in different functional positions while cutting off a slice.

In the first case the radial distance 22a is advantageously approximately 0 before the blade penetrates the cross-section 100' according to FIG. 2a and increases with increasing penetration (FIGS. 1B/2B) so that it reaches its maximum when the slice 101 is completely cut off according to FIGS. 1C/2C and wherein the radial distance decreases again when the retraction movement 18' of the stop plate 13, in particular of the entire cutting frame (FIGS. 1D/2D).

In the second case the blade 3 and the stop plate 13 can still overlap viewed in the axial direction 10 directly before a beginning of the penetration into the cross section 100" (FIG. 1A), in particular far enough so that the cutting edge 12a of the blade 3 remains within the flat contact surface 13.1, thus not even in the portion of the slanted plane 13.2 of the stop plate that is oriented towards the blade 3.

Thus, an overlap and therefore a negative radial gap 22a is provided wherein the overlap is reduced with increasing penetration and the overlap is reduced to 0 or an actual thus positive radial gap 22a is provided at the latest directly after complete separation of the slice 101 (FIG. 1C).

Thus, care has to be taken that the plate angle β between the slant 13.2 of the stop plate 13 and the flat front side of the stop plate 13 that is arranged opposite to the stop surface 13.1 is identical to or advantageously smaller than the blade angle α between the slanted cutting edge 12 and the flat back side of the blade 3 that is oriented towards the form tube 16' so that the gap 22 that opens in outward direction between the slanted plane 12.2 of the cutting edge 12 and the slanted plane 13.2 of the stop plate 13 becomes wider.

Additionally the blade 3 only lifts off in the third embodiment in FIGS. 2A through 2D as soon as complete cutting of the product strand 100 has been performed in a liftoff movement 27a, advantageously in the axial direction 10 from the front face 16" of the form tube 16' before or simultaneously with or after the retraction movement 18'.

Figure 2D:
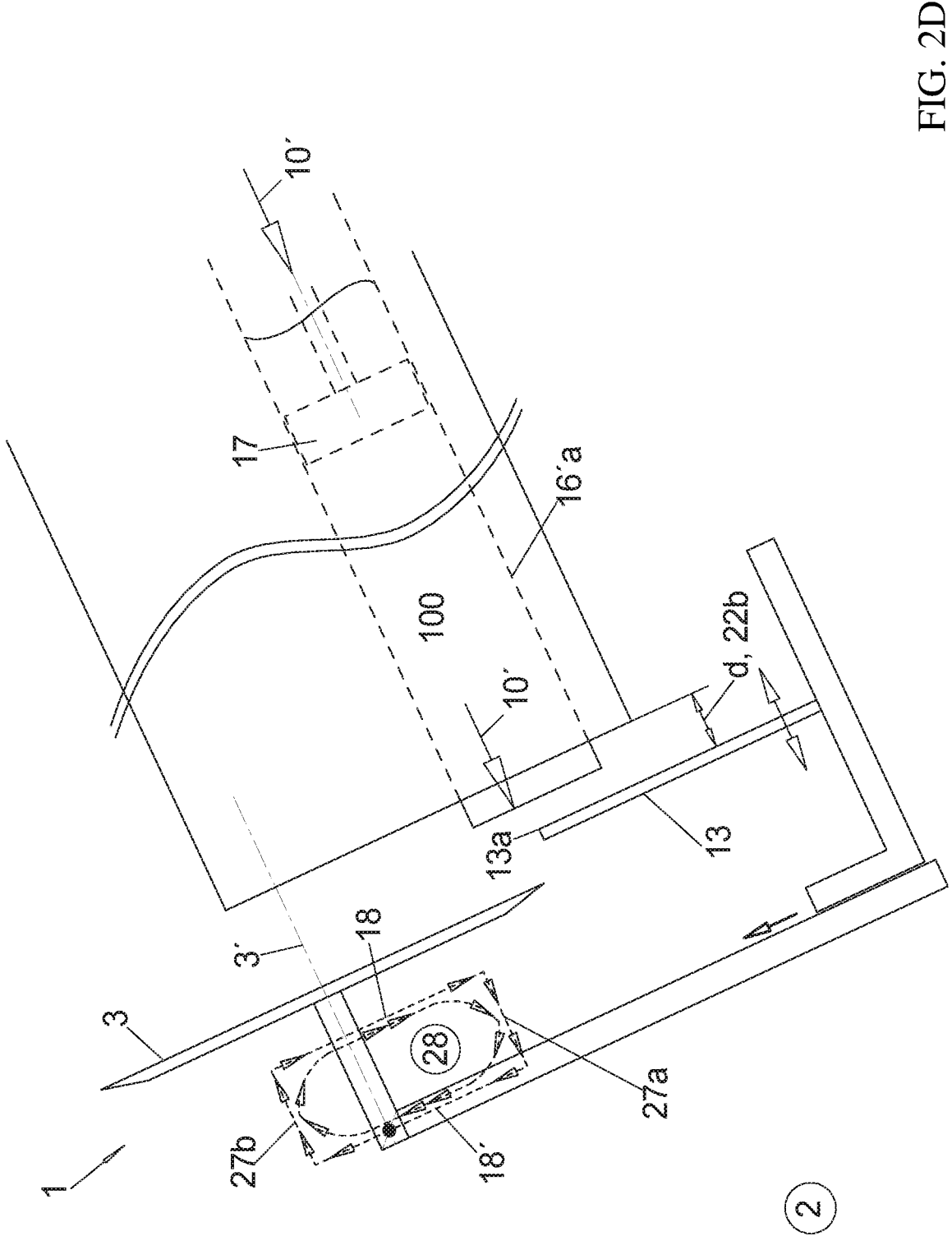
FIG. 2D illustrates a longitudinal sectional view through a product strand for a third embodiment of the cutting unit in different functional positions while cutting off a slice.

As illustrated in particular in FIG. 2D, this has the effect that the strand 100 can already be moved further forward beyond the front end of the form tube 16' at a beginning of the lift off movement 27a.

During or after completion of the retraction movement 18' the blade 3 is moved against the lift off movement 27a in a contact direction 27b, advantageously in a longitudinal direction 10, towards the form tube 16' until it has reached the starting position according to FIG. 2A.

Thus, the blade 3 performs an annular closed, e.g., rectangular or oval orbital movement 28 in this side view wherein the orbital movement 28 facilitates an earlier beginning of the feed movement of the product strand 100 after cutting off each slice 101 and thus the reduction of the idle times between two cutoff processes.

This lift off movement 27a and thus the orbital movement 28, however, are not jointly performed by the stop plate 13, but the stop plate 13 with the blade 3 only moves in the penetration direction 18 and in the retraction direction 18', however, typically not synchronically as described in reference in FIGS. 1A-1D, since it has to be provided during the lift off movement 27a and in particular the contact movement 27b as a stop for the advanced meat strand 100.

Since the blade 3 is rotatably attached at the cutting frame, not only the blade 3 but advantageously the entire cutting frame performs the described orbital movement 28.

The axial distance 22b advantageously remains constant during the cut off process and is typically only adjusted once before the cutting process of the product strand 100 begins in order to predetermine a thickness d of a slice or at the most between the cut off processes but typically not during the cutoff process.

FIGS. 3A-3F illustrate the cut off process, thus the penetration movement of the blade 3 viewed in the axial direction 10 of the blade 3 which is simultaneously the feed direction 10' of the product strand 100 for the first case recited supra, thus with a non-beveled contact surface of the stop plate 13 as illustrated in FIGS. 1B-2D.

Figure 3A:
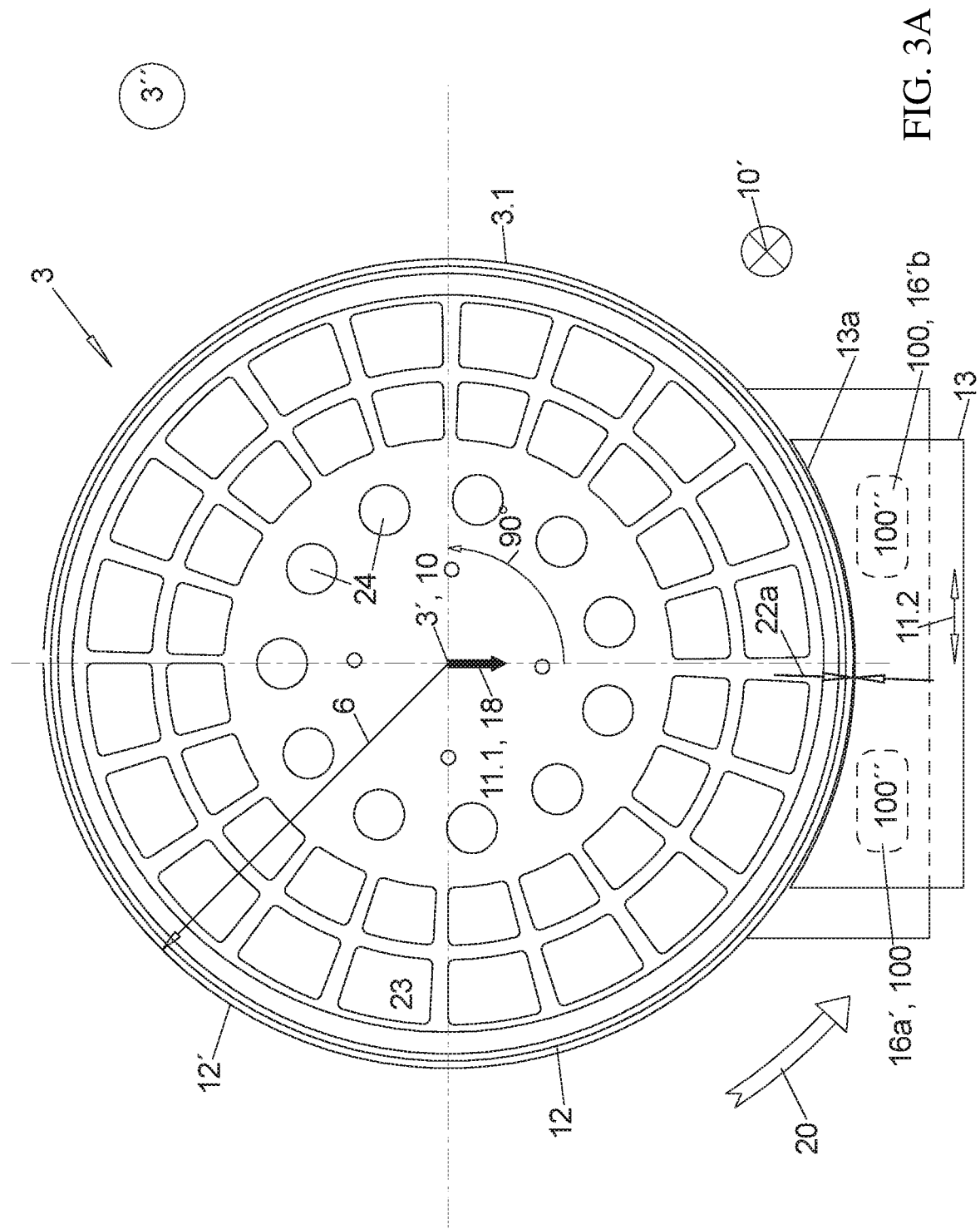
FIG. 3A illustrates one embodiment of a cutting unit with blade, contact plate and form tube in different rotation and penetration position of the blade viewed in the axial direction of the rotating blade.
Figure 3B:
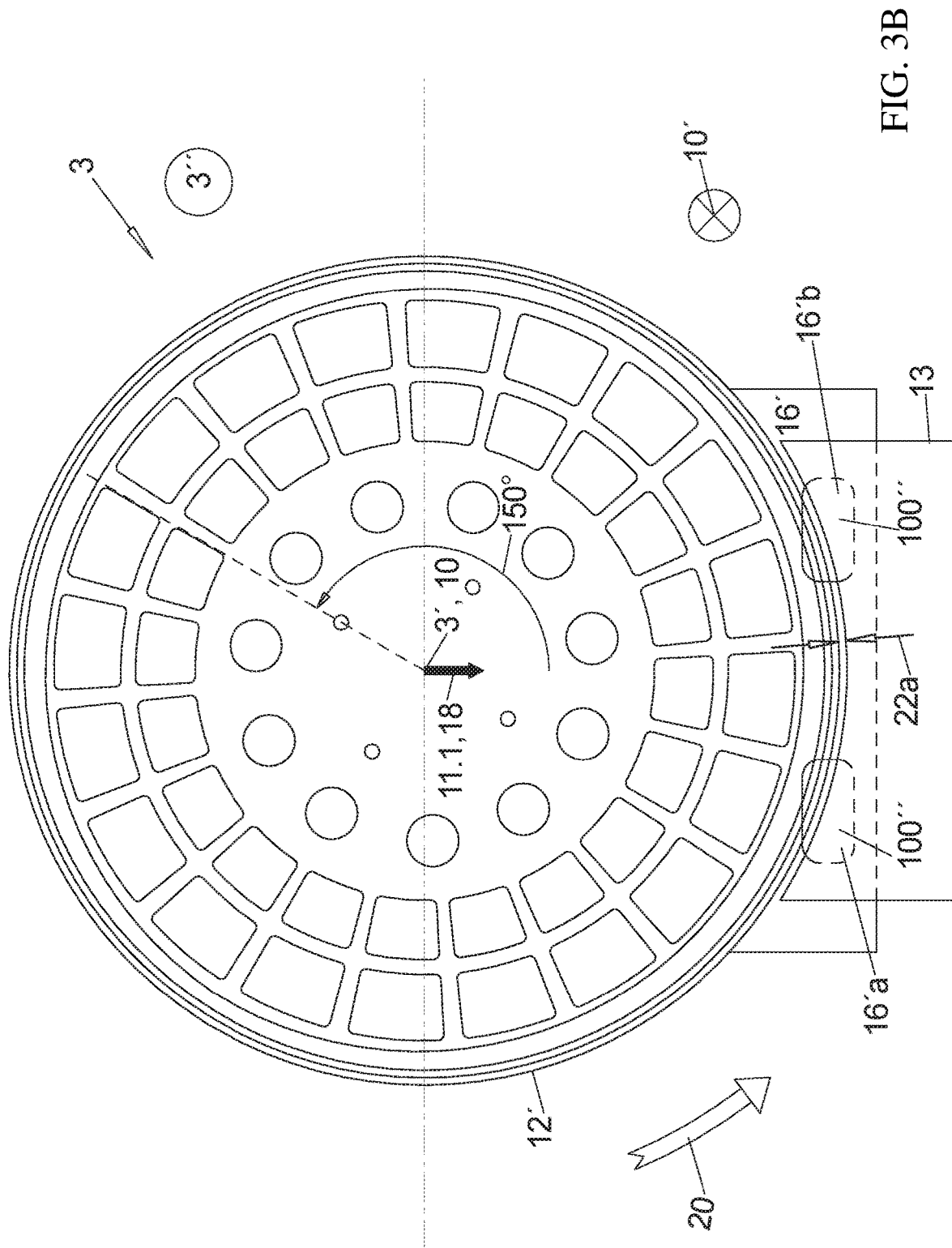
FIG. 3B illustrates one embodiment of a cutting unit with blade, contact plate and form tube in different rotation and penetration position of the blade viewed in the axial direction of the rotating blade.
Figure 3C:
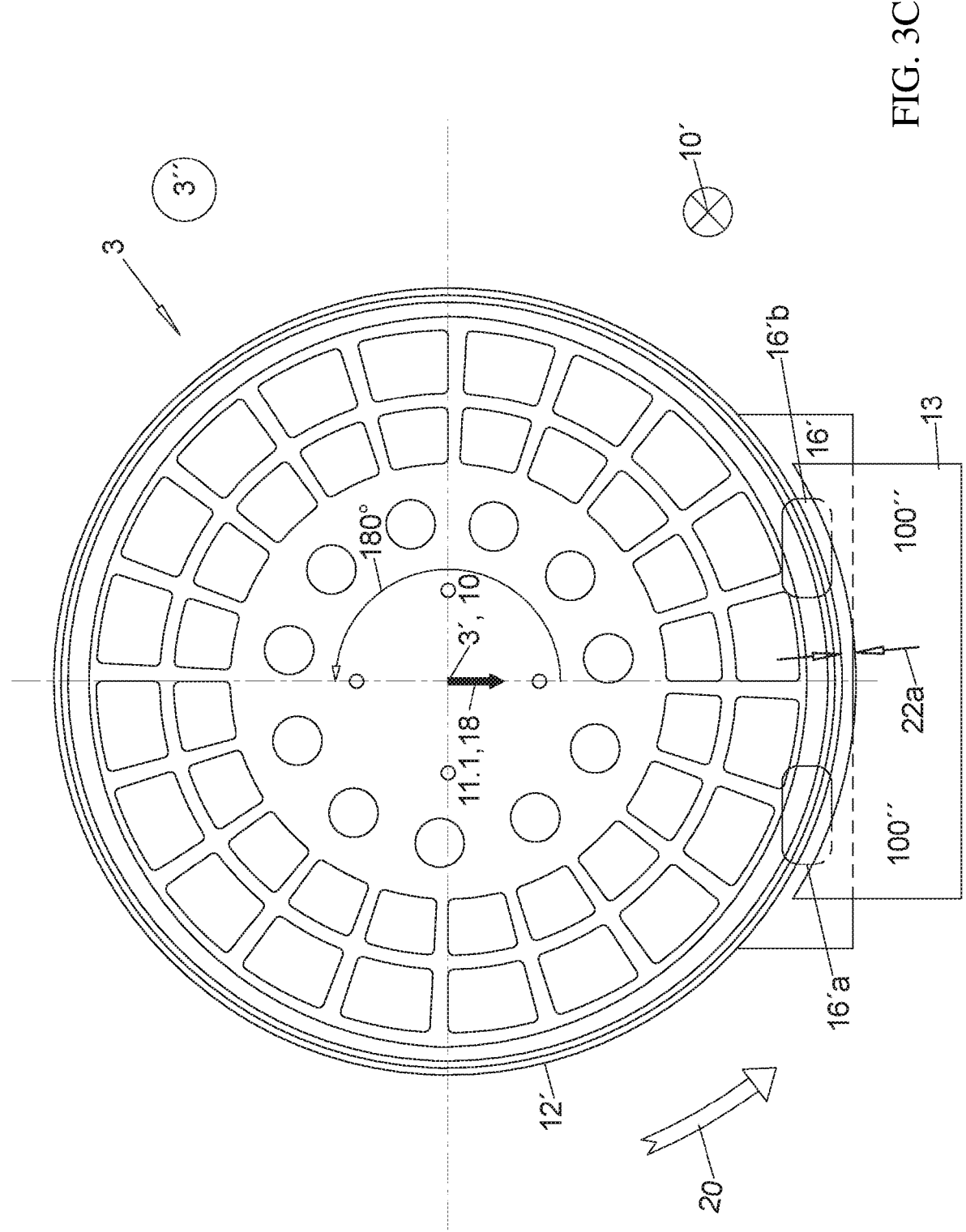
FIG. 3C illustrates one embodiment of a cutting unit with blade, contact plate and form tube in different rotation and penetration position of the blade viewed in the axial direction of the rotating blade.
Figure 3D:
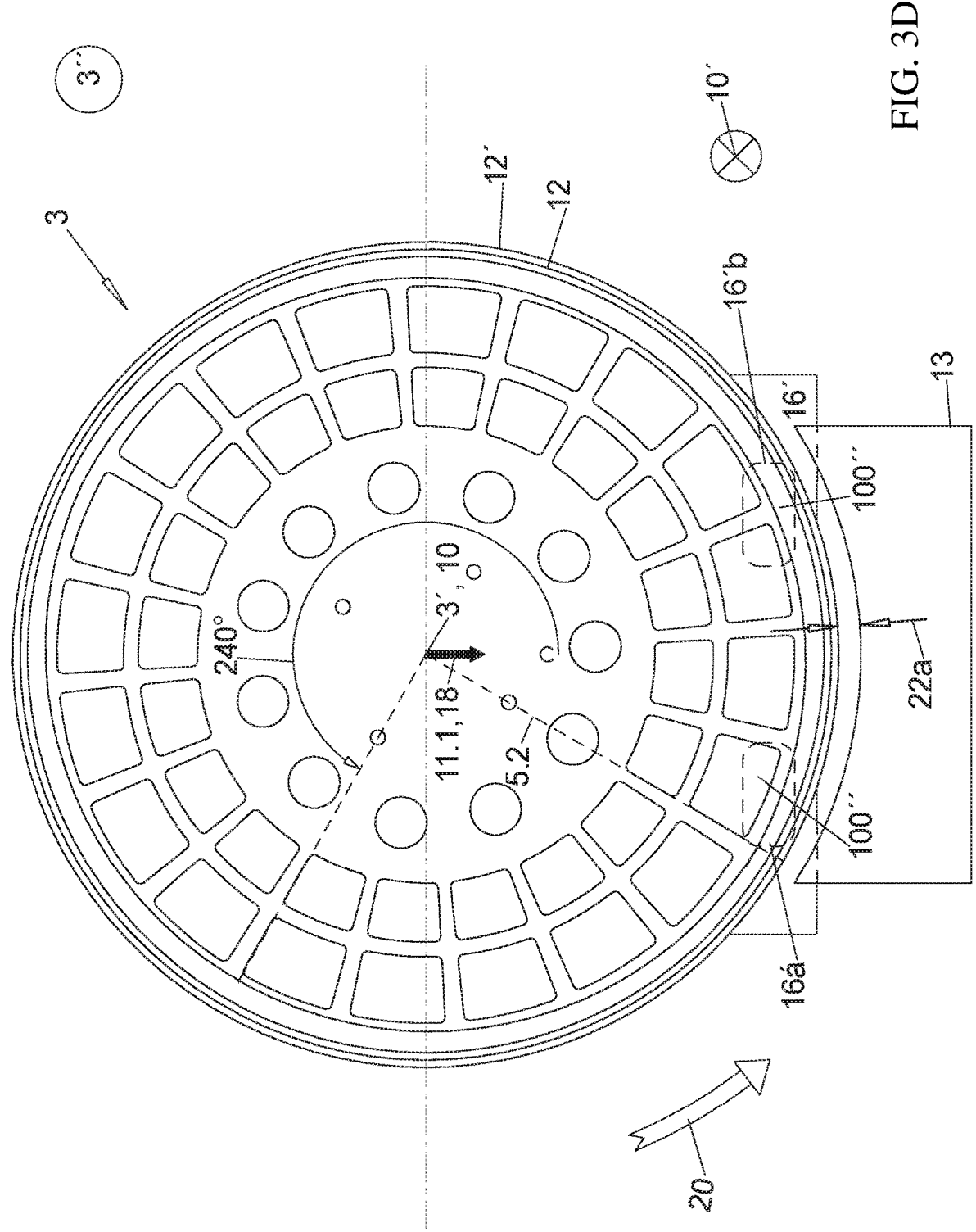
FIG. 3D illustrates one embodiment of a cutting unit with blade, contact plate and form tube in different rotation and penetration position of the blade viewed in the axial direction of the rotating blade.
Figure 3E:
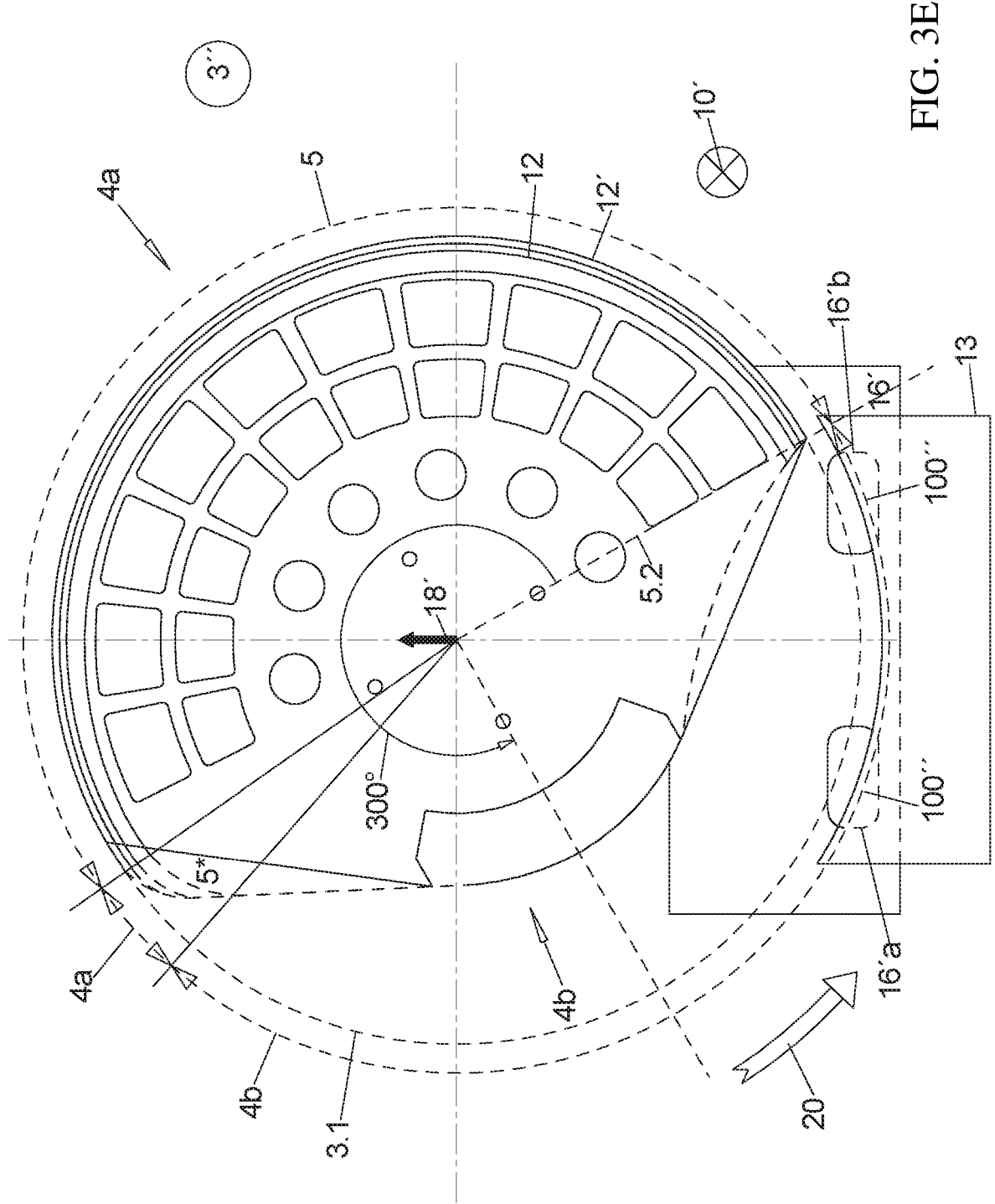
FIG. 3E illustrates one embodiment of a cutting unit with blade, contact plate and form tube in different rotation and penetration position of the blade viewed in the axial direction of the rotating blade.
Figure 3F:
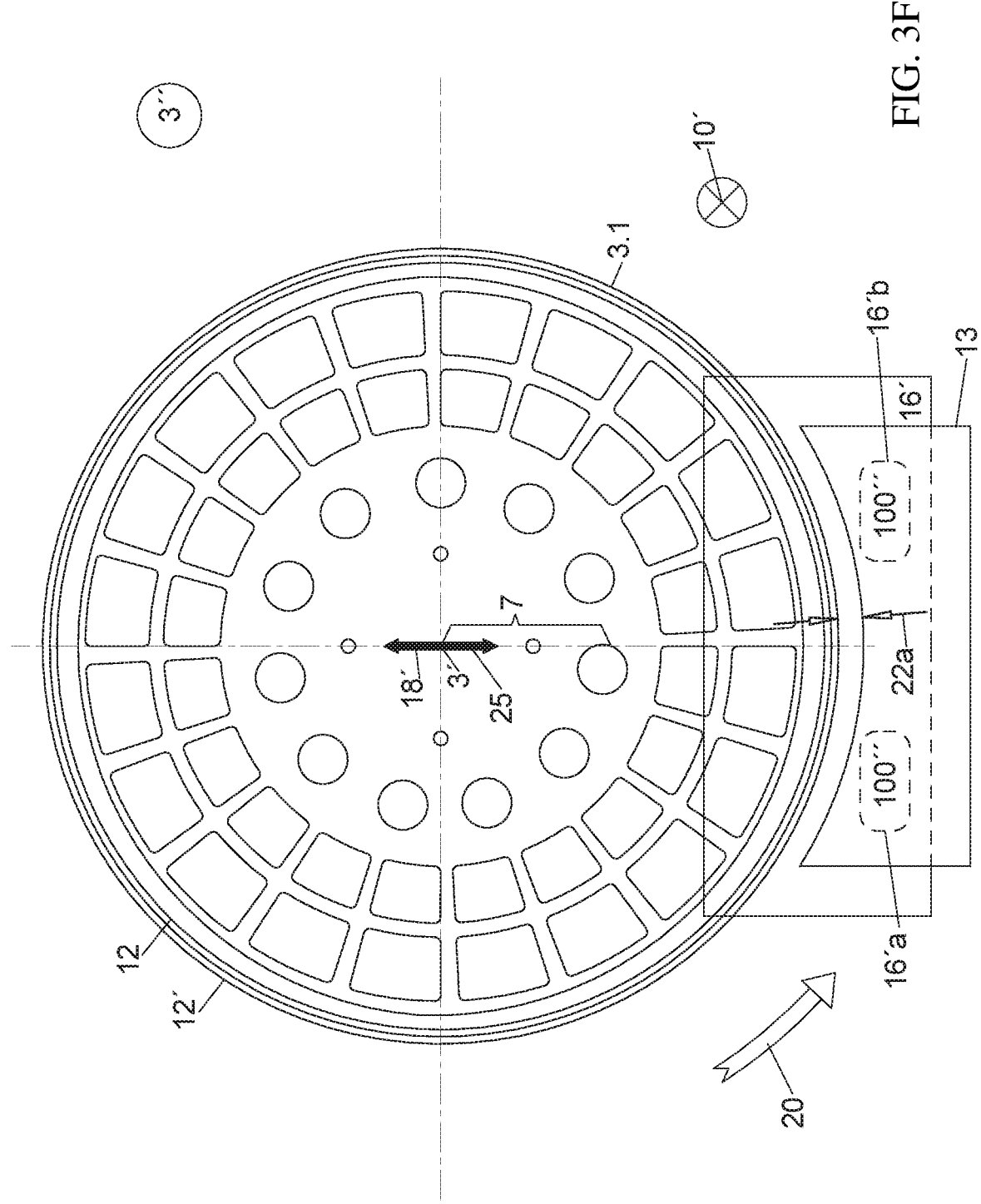
FIG. 3F illustrates one embodiment of a cutting unit with blade, contact plate and form tube in different rotation and penetration position of the blade viewed in the axial direction of the rotating blade.

The functional edge 13a, the portion of the circumference of the stop plate 13 that is oriented in this view towards the blade 3, is thus arranged at the most on the throwing circle 3.1 of the blade 3, otherwise at a radial distance 22a outside of the throwing circle 3.1 of the blade 3, wherein the functional edge 13a is configured concave with a curvature radius which is approximately the same side or slight greater than the curvature radius 6 of the cutting edge 12a of the blade edge 12 corresponding to the small radial distance 22a between the throwing circle 3.1 and the functional edge 13a since the curvature center of the functional edge 13a in one of the illustrated functional positions, typically the starting position according to FIG. 3F, is arranged on the rotation axis 3' of the blade 3.

The plate shaped blade 3 is illustrated as a circular disk-shaped blade 3 besides FIG. 3E with indentations 23 for weight savings on a front side of the plate shaped blade 3 and pass-through boreholes 24 which shall facilitate in particular gripping the blade 3 and which are advantageously arranged respectively on circular rings about the blade axis 3'.

In this case two form cavities 16'a, 16'b, are configured in the form tube 16' parallel adjacent to each other and the blade 3 as well as the stop plate 13 are wide enough in width direction, the second transversal direction 11.2, in which the two form cavities 16'a, 16'b are offset from each other so that the blade and the stop plate can cover both form cavities 16'a, 16'b simultaneously. Thus a penetration of the blade 3 simultaneously cuts off a respective slice 101 from both product strands 100 that are arranged adjacent to each other.

The rotation direction 20 of the blade is counter-clockwise in the instant case.

Thus, the radial distance 22a is approximately 0 in FIG. 3A directly before a beginning of the penetration movement 18 as illustrated in FIG. 2A, and increases with an increasing penetration movement 18 of the blade 3 (FIGS. 3B-3D) so that the radial distance is at a maximum when the throwing circle 3.1 of the circular disk shaped blade 3 is in a most forward position in the penetration direction 18 which is the lowest position in these drawing figures, and wherein the throwing circle has cut through the cross-section 100" of both product strands 100 completely (FIG. 3D).

Thereafter the blade 3 moves back against the penetration direction 18 in the retraction direction 18' according to FIG. 3e up to the starting position according to FIG. 3F.

Also for a circular disk-shaped blade 3 as illustrated in FIGS. 3A-3D and 3F cutting off a slice 101 is advantageously performed during less than one revolution of the blade 3.

This applies even more so for the case where the blade 3 as illustrated in FIG. 3E is a blade which does not have a circular circumferential contour in a direction of the blade axis 3', but the circumferential contour is only configured over a portion as a circular segment 5 in which the circumferential edge is configured as a blade edge 12. A short initial cutting portion 5* can adjoin to the front end of the circular segment 5 in the rotation direction 20 in which the circumference of the blade is also configured as a blade edge 12 but is already recessed radially inward from the throwing circle 3.1 of the circular segment 5.

Both together form the cutting edge portion 4a in which the circumference is configured as a blade edge 12 whereas the rest of the circumference which is arranged within the throwing circle 3.1 and substantially recessed therefrom is the residual edge portion 4b in which the circumferential edge is not configured as a blade edge 12.

Based on FIG. 3E it becomes clear that moving the product strands 100 supported in the cross sections 100" can already be commenced for a blade 3 thus configured in the blade position according to FIG. 3e in which the rear edge of the cutting edge portion 4a in the rotation direction 20 has already left the cross sections 100" and thus early than for a circular disk shaped blade 3 which helps to further minimize idle times between two processes.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A method for cutting off slices by a blade using a cutting edge of the blade from a front end of a product strand, the method comprising the steps:
   moving the product strand forward in the feed direction until it contacts a stop surface of a stop,
   moving the blade, which is offset against the feed direction, from the stop surface by an axial distance in the penetration direction with the cutting edge through the cross section of the product strand,
   moving the increasingly cut off slice through a gap between the stop plate and the blade, and
   flipping the cut off slice over a functional edge of the stop, the functional edge being offset from a throwing circle of the blade radially with respect to the rotation axis by a radial distance, wherein
   the radial distance is changed while the cutting edge runs through the cross section of the product strand.

2. The method according to claim 1, further comprising the steps of:
   increasing the radial distance towards an end of the cutting movement, and resetting the radial distance to a radial starting distance after completing the cutting movement and before contacting the stop plate with the advanced product strand.

3. The method according to claim 1, whereas the radial distance is controlled so that no radial overlap of the stop plate and the throwing circle of the blade is provided at a beginning of the cut off process, and the radial distance is zero or has a positive value during penetration of the cutting edge into product strand.

4. The method according to claim 2 wherein the resetting the radial distance step further comprises resetting the radial distance to the radial starting distance, wherein the resetting starts at one of:
   before the blade has completed its forward movement in the penetration direction; or
   before the blade performs a lift off movement from the product strand in one of a blade orthogonal direction or a feed direction of the product strand after cutting off the slice.

5. The method according to claim 2 further comprising the step of: completing the resetting the radial distance to the radial starting distance at one of:
- during or at least after completing the lift off movement, directly after completing cutting off the slice, or
- when the advanced product strand reaches the stop surface of the stop plate.

6. The method according to claim 1 further comprising the step of moving the stop plate backward relative to the blade in a direction towards a radial starting distance for a rotating blade with a non-circular circumferential contour that is arranged within the throwing circle of the cutting edge of the blade after a complete cut off of the slice and before an overlap of the throwing circle of the blade and the cross section of the product strand is completed.

\* \* \* \* \*